United States Patent [19]

Traub et al.

[11] Patent Number: 4,759,062

[45] Date of Patent: Jul. 19, 1988

[54] ARRANGEMENT FOR AND METHOD OF PROTECTING PRIVATE SECURITY CODES FROM UNAUTHORIZED DISCLOSURE

[75] Inventors: Gilbert Traub, Bayside; Norman Kaish, Whitestone, both of N.Y.

[73] Assignee: International Electronics Technology Corporation, Far Rockaway, N.Y.

[21] Appl. No.: 915,428

[22] Filed: Oct. 6, 1986

[51] Int. Cl.⁴ .............................................. H04L 9/00
[52] U.S. Cl. ......................................... 380/25; 380/23
[58] Field of Search .............................. 380/23, 24, 25; 235/380, 382

[56] References Cited

U.S. PATENT DOCUMENTS

| 4,139,864 | 2/1979 | Schulman | 380/10 |
| 4,211,919 | 7/1980 | Ugon | 380/23 |
| 4,267,578 | 5/1981 | Vetter | 340/365 R |
| 4,318,005 | 3/1982 | Heckelman et al. | 307/10 AT |
| 4,347,545 | 8/1982 | Weishaupt et al. | 340/825.32 |
| 4,471,216 | 9/1984 | Herve | 380/23 |
| 4,484,067 | 11/1984 | Obrecht | 235/382 |
| 4,575,621 | 3/1986 | Dreifus | 235/380 |

Primary Examiner—Salvatore Cangialosi
Assistant Examiner—Aaron J. Lewis
Attorney, Agent, or Firm—Kirschstein, Kirschstein, Ottinger & Israel

[57] ABSTRACT

A private security code used for rendering microprocessor-based electronic equipment operational need not be selected or remembered by the user of the equipment. Instead, an authorized service center generates the private security code needed to re-enable disabled equipment. The equipment includes a built-in microprocessor for executing a program stored in internal memory, a random number generator for generating an unpredictable code, and a display for displaying the unpredictable code. The microprocessor also executes an encryption routine for encrypting the unpredictable code and storing the encrypted code in the internal memory protected from exterior interrogation. The service center generates the same encrypted code in response to knowledge of the displayed unpredictable code. Entry of the same encrypted code via a keyboard into the disabled equipment re-enables the same.

9 Claims, 2 Drawing Sheets

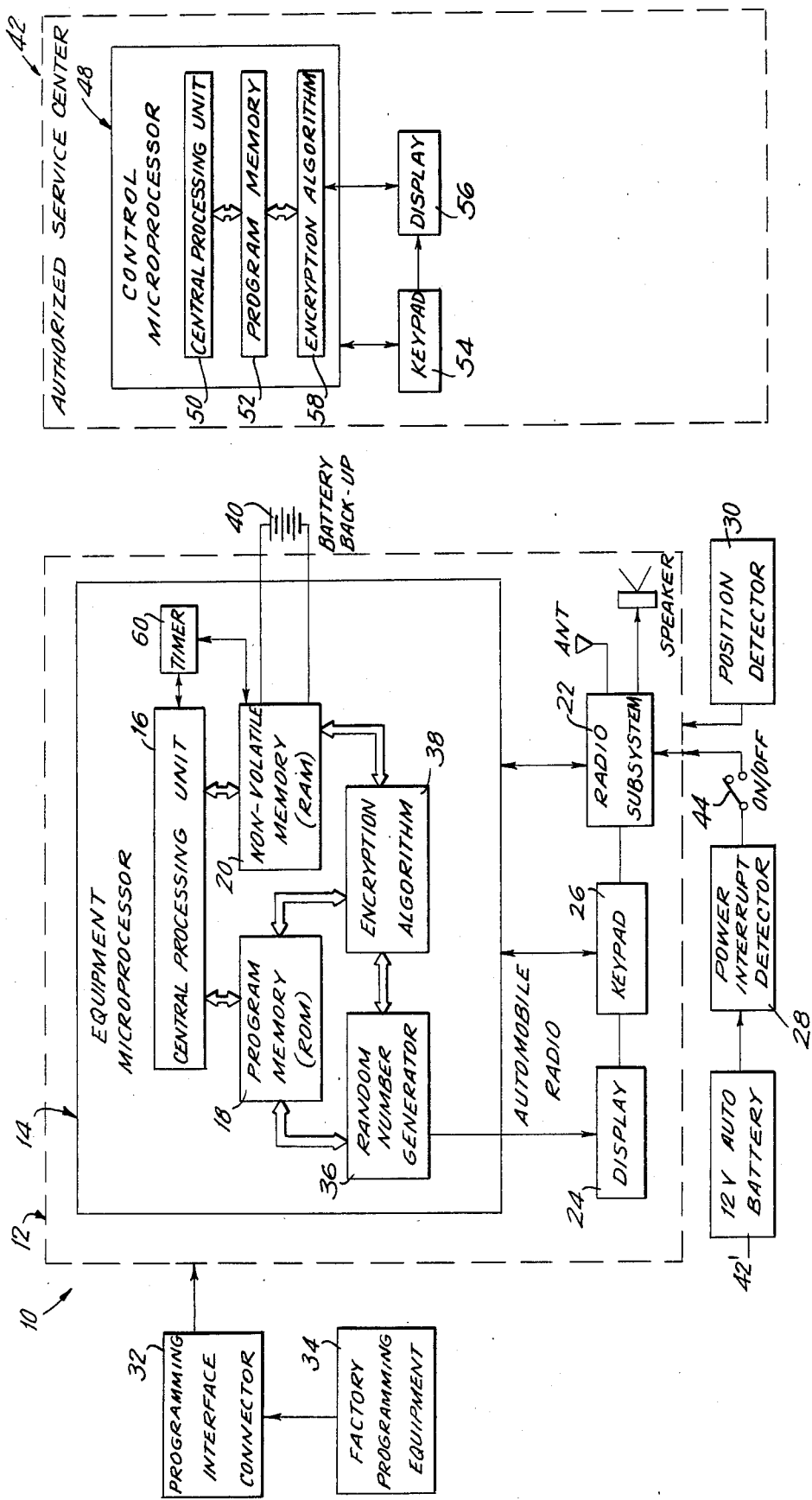

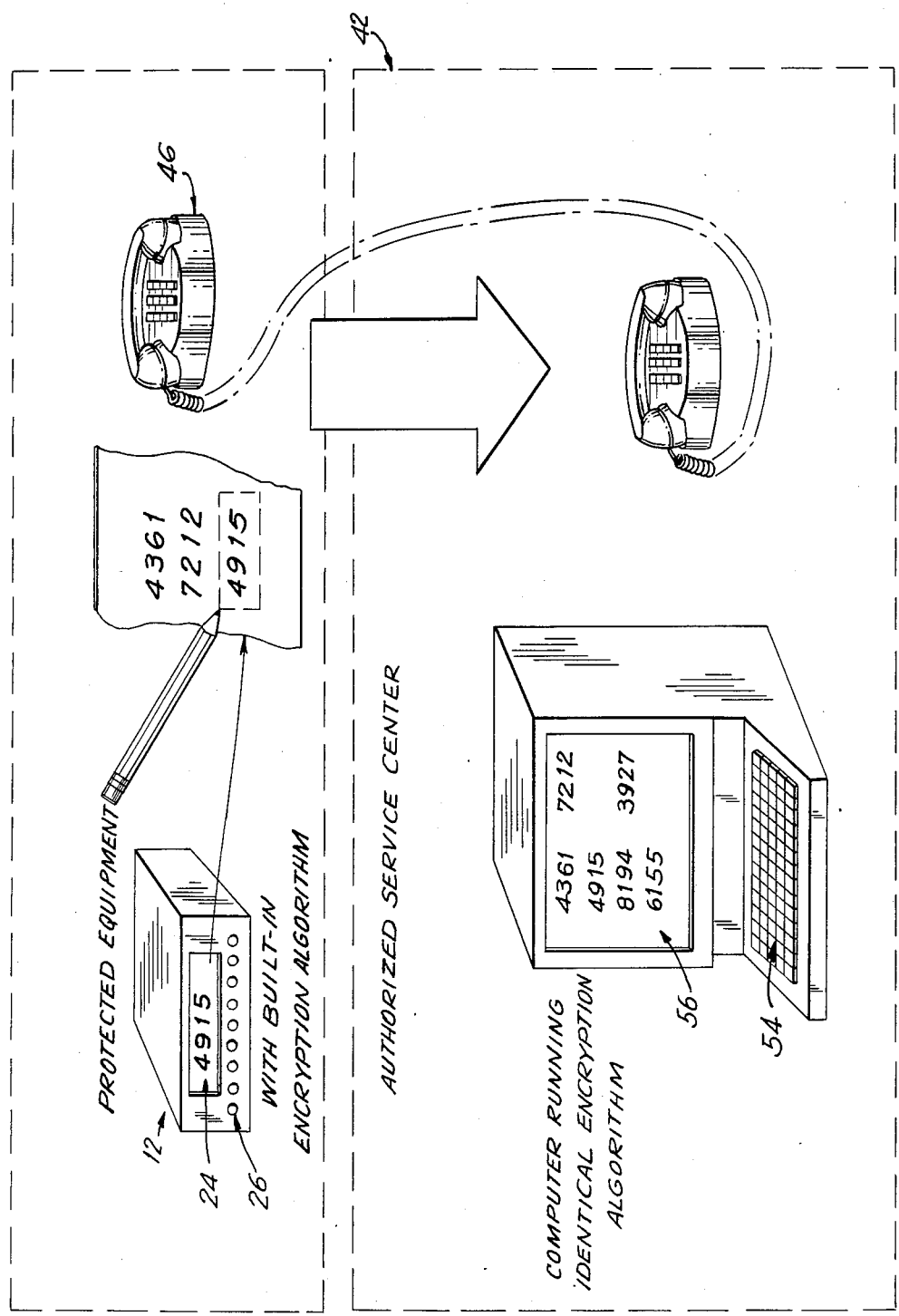

ARRANGEMENT FOR AND METHOD OF PROTECTING PRIVATE SECURITY CODES FROM UNAUTHORIZED DISCLOSURE

BACKGROUND OF THE INVENTION

1. Field of the Invention

The present invention generally relates to a security arrangement for, and a method of, protecting from unauthorized disclosure a private security code used for rendering microprocessor-controlled electronic equipment operational.

2. Description of Related Art

U.S. Pat. No. 4,494,114 disclosed a lock-out security arrangement for and method of maintaining microprocessor-controlled electronic equipment normally operational until the occurrence of a disabling event and, thereupon, for rendering the equipment inoperative after the occurrence of the disabling event and for maintaining the equipment inoperative even after the disabling event has terminated until a private security code has been entered via a keyboard to the equipment microprocessor. In one particularly advantageous application, the equipment was a radio installed in an automobile dashboard, in which case, the disabling event was a theft which can be detected, for example, by sensing an interruption of power from the automobile battery, or by sensing the physical removal of the radio from the dashboard.

In said patent, the user selected and remembered the private security code. The stolen equipment was essentially valueless to a thief, because the equipment remained inoperative until the private security code was entered to the microprocessor. Inasmuch as the private security code was just that, i.e. secret and selected by, and known only to, the user, there was no way for the thief to obtain the code. The thief could not physically or electronically interrogate the microprocessor to learn the code, because the code was stored in an internal, non-volatile memory, e.g. a read/write random access memory with a battery back-up circuit, or an electrically erasable programmable read only memory, accessed solely from within and, hence, protected from external interrogation.

Although very satisfactory for its intended purpose, the patented lock-out arrangement and method can be implemented in another mode which does not require the user to select, remember, change or otherwise use any private security code. It would be desirable in certain applications if system security did not depend on a user having a forgetful memory. Also, in the event that a user was threatened by a thief to divulge the private code, it would be desirable, in terms of system security, if the user did not know the private code.

Other security systems of which we are aware include U.S. Pat. Nos. 4,139,864; 4,495,540; 4,318,005; 4,347,545 and 4,267,578.

SUMMARY OF THE INVENTION

1. Objects of the Invention

It is a general object of this invention to further improve the patented security arrangement and method as identified above.

Another object is to prevent a user from having to select, remember, change or otherwise have to use a private security code.

An additional object is to assist users having a foregetful memory from having to remember the code.

Yet another object is to prevent a user under pressure to divulge the code from having to remember the code, or having any knowledge thereof.

An additional object is to establish an independent, authorized service center to which access is restricted, with the primary responsibility of re-enabling disabled equipment.

2. Features of the Invention

In keeping with these objects, and others which will become apparent hereinafter, one feature of this invention resides, briefly stated, in a security arrangement for, and a method of, protecting from unauthorized disclosure a private security code used for rendering electronic equipment operational. The invention comprises an equipment microprocessor built into the equipment, e.g. a microprocessor-controlled radio, a television set, a video cassette recorder, a computer terminal, a stereo system, an office typewriter, etc. The microprocessor preferably constitutes a single, integrated circuit, programmed chip, operative for executing a program having several routines, one of which is an operational routine for controlling the normal operation of the equipment. The microprocessor has an internal, non-volatile memory, e.g. a read/write random access memory (RAM) with a battery back-up circuit, an electrically erasable programmable read only memory (EEPROM), or the like, accessed solely from within and protected from external interrogation, both physical and electronic. The operational routine maintains the equipment operational until a disabling event, as defined below, has occurred. The operational routine is executed only after execution of a one-time-only initialization in which a complete initial execution of the program and a subsequent execution thereof are distinguished.

A code entry means, e.g. a manual entry keyboard, is provided on the equipment, and is operatively connected to the microprocessor for entering codes, e.g. the private security code, thereto and/or for entering functions.

The invention yet further includes detector means, e.g. a power interrupt detector, a position detector, a timer, etc., operatively associated with the microprocessor for detecting the occurrence of the disabling event. Also included is disabling means, e.g. a disabling routine of the program, operative for causing the microprocessor to execute the disabling routine after the detection of the disabling event in order to disable the equipment from normal operation, and for maintaining the equipment disabled, even after the disabling event has been terminated, until after the private security code has been entered on the keyboard.

The disabling event can be a theft event wherein the equipment is removed from its normal authorized operating location, or from its source of electrical power. Alternatively, the disabling event can be defined as any unauthorized use of the equipment. This may occur after elapse of a predetermined time when use of the equipment was authorized, but, after which, further use was unauthorized.

The invention further comprises enabling means, e.g. an enabling routine of the program, operative in response to entry of an enabling request entered via the keyboard to render disabled equipment operational. A code generating means is responsive to each enabling request for generating an unpredictable code each time the enabling request has been entered. Advantageously, the code generating means is a code generating routine of the program, the code generating routine being operative for preferably generating a numerical unpredictable code from a multitude of available numerical codes. For this purpose, a random number generating routine can be used, it being understood that the particular code generated at any one time is unknown and unpredictable in advance.

A communication means, e.g. a display, may be provided on the equipment to publicly display the random number code. This displayed code will be used, as described below, to generate the private security code.

An encryption means, e.g. an encryption routine of the program, is responsive to generation of the unpredictable code for encrypting the same into an encrypted code which constitutes the private security code, and for causing the encrypted code to be stored into the internal memory of the microprocessor. Both the encryption routine and the encrypted code are protected from external interrogation because they are stored inside the microprocessor itself. A thief cannot learn the encryption routine or the encrypted code because he has no access to the interior of the microprocessor.

Since the authorized user, just like the thief, does not know the private security code, i.e. the encrypted code, the only way to render the disabled equipment operational again is for the user to consult with an authorized service center to which access is available only to authorized personnel. A security control means is located at the service center remote from the equipment, and includes a control microprocessor having a control memory in which a control encryption routine identical to the aforementioned encryption routine in the equipment microprocessor is stored. A data entry means, e.g. a control keyboard, is operatively connected to the control microprocessor. The aforementioned unpredictable code displayed on the display of the equipment is now entered via the control keyboard and, in turn, the control microprocessor executes the control encryption routine and generates the same encrypted code previously stored in the internal memory of the equipment microprocessor. A control communicator at the service center communicates the same encrypted code. The control communicator may be a display at the service center.

Now, since the same encrypted code is generated at the service center and, of course, is known, the same encrypted code may be entered to the equipment microprocessor, e.g. via the keyboard, to cause the equipment microprocessor to execute a re-enabling routine of the program for again rendering the disabled equipment operational. The encrypted code may be manually entered by the authorized service personnel in the event that the user went to the service center, or may be manually entered by the user in the event that the user telephones the service center. Alternatively, a telephone link may be established between the service center and the disabled equipment and, in such event, rather than displaying the encrypted code at the service center, the encrypted code generated at the center can be sent via the telephone link directly to the hooked-up equipment, and the encrypted code may be automatically entered by the control microprocessor.

Hence, this invention does not require the user to select, remember, change or otherwise have to deal with the private security code. Instead, the authorized service center would have the responsibility to reactivate disabled or locked-out equipment. A high level of security is maintained since all codes and encryption routines either reside internal to the equipment microprocessor which is protected from external interrogation, or reside in the control microprocessor at the service center to which intruder access is unavailable. Authorized user access to the service center would be verified in advance.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 1 is a block diagram of the arrangement and method in accordance with this invention; and FIG. 2 is a schematic view of the arrangement and method in accordance with this invention.

DETAILED DESCRIPTION OF THE PREFERRED EMBODIMENTS

Referring now to the drawings, FIG. 1 depicts in block diagram form a security arrangement 10 for and method of protecting from unauthorized disclosure a private security code used for rendering electronic equipment operational. The equipment is shown and described as being an automobile radio 12, but it will be expressly understood that any piece of microprocessor-controlled electronic equipment in any application or environment lies within the scope of this invention. As explained below, the essential idea is to render and maintain the equipment 12 inoperative after the occurrence of a disabling event so as to render the equipment essentially valueless. The disabling event can be a theft event wherein the equipment is physically removed from its normal intended location and/or is electrically disconnected from its source of electrical power. The disabling event can also be any unauthorized use which can be defined after elapse of a predetermined time during which use was authorized.

A lock-out security arrangement for and method of rendering such equipment inoperative after the occurrence of a disabling event was disclosed in U.S. Pat. No. 4,494,114, the entire contents of which are hereby incorporated herein by reference. Thus, by way of brief review, the equipment 12 had a built-in microprocessor 14 which controlled at least one control function for controlling the normal operation of the equipment. The microprocessor 14 was a single integrated circuit chip having a central processing unit (CPU) 16, a read only memory (ROM) 18, a non-volatile read/write internal random access memory (RAM) 20, and input and output terminals for connecting to such external devices as a radio subsystem 22, a communicator or display 24, a code entry means or keypad 26, a power interrupt detector circuit 28, a position detector circuit 30, and a programming interface connector 32 to which factory programming equipment 34 is connected.

As described below, this invention includes a random number generator 36 and an encryption algorithm 38, both of which may be advantageously incorporated as routines in a program executed by the microprocessor 14 and permanently stored in the program memory 18. The CPU is the sole source of access to the ROM 18 and to the RAM 20 in which data is stored. External interrogation of any data stored in the ROM 18 or the RAM 20 is impossible. A CMOS microprocessor like the industry standard Model No. 80C48 can be used with a battery back-up circuit 40 to provide non-volatile memory storage so that the data stored in the RAM 20 will remain intact even after power, such as a 12 v automobile battery 42', to the radio 12 has been removed. A lithium battery can retain data in such memory for years. A rechargeable battery will retain data after power removal, and will recharge during normal powered operation. Newer single chip EEROM microprocessors containing internal non-volatile memories without battery back-up circuits could also be employed.

Now, as explained in the above-identified patent, the radio owner or authorized user may select his or her own unique private security code. In the event that a disabling event is detected by the power interrupt detector 28 and/or the position detector 30, the microprocessor 14 disables the equipment and maintains the equipment disabled unless and until the previously selected private security code is entered via the keypad 26. In order to spare the user the trouble of having to select and remember this private security code, this invention contemplates relieving the user of any responsibility with respect to the private security code and, instead, delegates this responsibility to an authorized service center 42, as explained below.

Hence, in accordance with the present invention, once a disabling event has been detected, the user will attempt to turn on the radio 12 by actuating the on/off switch 44. This switching action is interpreted by the microprocessor as an enabling request in order to render the disabled equipment operational. Alternatively, depression of one or more predetermined keys on the keypad 26 may be interpreted by the microprocessor as the enabling request. In any event, once such an enabling request is made, the random number generator or routine 36 generates a random number, which is displayed on the display 24. This situation is diagrammatically depicted in FIG. 2 wherein the random number "4915" was generated from a multitude of possible numbers.

The random number generator 36 need not be a true, or even a pseudo, random number generator. It is sufficient that the routine 36 generate an unpredictable code, e.g. one code from among a multitude of possible codes, there being no way to know in advance, due to the multitude of possible codes, exactly which code will be displayed at any one time. One way of doing this is to have the routine 36 count through the multitude of possible codes. Then, when the enabling request is made, that unpredictable moment will be used to stop the counting and, in turn, to select the unpredictable code. As used herein, the term "code" encompasses both numeric and/or alphabetic characters.

Once the unpredictable code is generated and displayed, the encryption algorithm 38, which is another routine of the program, is executed by the microprocessor 14 in order to generate an encrypted code, and to store the encrypted code in the RAM 20. This stored encrypted code is the private security code which, once entered via the keypad 26, will re-enable the radio 12. However, the stored encrypted code is not known to the user, or to anyone else, for that matter, since both the stored encrypted code and the encryption algorithm are stored within the microprocessor, a device proprietary to the manufacturer.

To discover the identity of the stored encrypted code, i.e. the private security code, the user must consult with the service center 42 to which access is restricted to authorized personnel only. The user may consult with the service center 42 by telephone 46 or in person. The center 42 has a computer provided with a control microprocessor 48 having a central processing unit 50, a memory 52, a keypad 54 and a display 56. The microprocessor 48 executes a control program having an encryption algorithm 58 identical to that of algorithm 38.

The user, once his or her status as an authorized user is verified, may now advise the authorized service center personnel of the identity of the displayed unpredictable code. The service center personnel will enter this displayed unpredictable code via the keypad 54 into the control microprocessor 48, in which event, the microprocessor 48 will execute the algorithm 58 and generate the same encrypted code previously stored in RAM 20 of the equipment. This said same encrypted code will be displayed on the service center display 56 and, now, the known encrypted code may be entered via the keypad 26 to re-enable the radio.

In a variant, the service center 42 may be a national center, in which case, users around the country may consult by telephone 46 or by visiting satellite centers whose main function would be to verify the authorized status of the users.

The re-enabling of the disabled radio need not be by manual entry of the encrypted code on the keypad 26. It is possible for the re-enabling procedure to be accomplished automatically over the telephone system 46 by connecting the disabled radio to a modem at one end of the telephone system, and by connecting the control microprocessor at the other end of the telephone system.

Since the code displayed on equipment display 24 is unpredictable, the corresponding encrypted code will be different each time the encryption algorithm is used. Security of the system will depend on maintaining the security of the algorithm which is, in effect, buried within the microprocessor 14, or safeguarded at the service center 42. It is almost impossible to deduce the algorithm from observation of numerous displayed codes.

This invention greatly simplifies production since there is no need to individually program each piece of equipment with a different private security code; nor is there any need to provide bookkeeping for each piece of equipment and its associated private security code. Each piece of equipment would be totally identical; however, the security code would be different for each piece of equipment and different each time it was used on the piece of equipment. This provides for a very desirable combination of ease of production and maintenance, as well as a high confidence level of built-in security.

Returning to FIG. 1, a timer 60, either implemented by a timing routine of the program, or implemented by hardware, e.g. a capacitor, may be set to a predetermined time period during which use of the equipment is authorized, but after which continued use of the equipment is unauthorized. This feature can be advantageously used in special situations, such as munitions, where the owner of the munitions does not want the equipment used after a certain time.

The encryption routine incorporates several standard cryptographic techniques, the details of which are conventional. For reference, one can refer to the following sources:

Denning, Dorothy E. R., *Cryptography and data security*. Reading, Mass.: Addison-Wesley, 1982.

Meyer, Carl H. and Matyas, Steven M., *Cryptography: a new dimension in computer data security*. New York: Wiley, 1982.

The equipment microprocessor 14 is advantageously a single integrated circuit chip in which the program memory 18 and data memory 20 are stored. Yet, this invention further comprises fabricating the microprocessor as two or more chips and, in fact, the program and data memories may be located on separate chips. It could also be that the timer 60, the random number generator 36, the encryption algorithm, or other program routines might be physically located on, or be distributed among, different chips. In any event, the term "internal protected memory" as used in the specification and claims is intended to cover both a single chip design, as well as a multi-chip design wherein the different chips are potted.

Also, the terms "encryption means", "encryption routine" or "encryption algorithm" are intended to cover look-up tables. Thus, each unpredictable code can represent the input variable to a look-up table having a multitude of input variables and a correspondingly associated multitude of output variables.

It will be understood that each of the elements described above, or two or more together, also may find a useful application in other types of constructions differing from the types described above.

While the invention has been illustrated and described as embodied in an arrangement for and method of protecting private security codes from unauthorized disclosure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A security arrangement for protecting from unauthorized disclosure a private security code used for rendering electronic equipment operational, comprising:

(A) an equipment microprocessor within the equipment and having an internal protected memory which is accessed solely by the equipment microprocessor and which is protected from interrogation external to the equipment microprocessor;

(B) code entry means operatively connected to the equipment microprocessor for entering the private security code;

(C) said equipment microprocessor being operative for executing a program stored in the internal memory, said program having an operational routine for rendering the equipment operational and for maintaining the equipment operational until a disabling event has occurred;

(D) detector means operatively connected to the equipment microprocessor, for detecting when the disabling event has occurred;

(E) disabling means responsive to the detector means, for disabling the equipment from normal operation after the disabling event has been detected, and being further operative for maintaining the equipment disabled, even after the disabling event has terminated, until after the private security code has been entered;

(F) enabling means for rendering disabled equipment operational in response to entry of an enabling request via the code entry means;

(G) code generating means responsive to each enabling request, for generating an unpredictable code each time the enabling request has been entered;

(H) means for displaying the unpredictable code;

(I) encryption means responsive to the code generating means, for encrypting each unpredictable code into an encrypted code which constitutes the private security code, and for causing the encrypted code to be stored into the internal memory, said encryption means constituting an encryption routine as part of the program stored in the internal memory, both the encryption routine and the stored encrypted code being protected from interrogation external to the equipment microprocessor;

(J) security control means separate from the equipment, said control means including (i) a control microprocessor having a control memory in which a control encryption routine identical to said first-mentioned encryption routine is stored, (ii) a data entry means for entering the aforementioned displayed unpredictable code into the control microprocessor, (iii) said control microprocessor executing the control encryption routine to generate the same encrypted code as previously stored in the internal memory of the equipment microprocessor, and (iv) a control display for displaying said same encrypted code; and (K) re-enabling means responsive to entry of said same encrypted code into the equipment microprocessor via the code entry means, for again rendering the disabled equipment operational.

2. The security arrangement as recited in claim 1, wherein the code generating means includes a number generator for generating a sequence of numbers constituting the unpredictable code from a multitude of possible numbers.

3. The security arrangement as recited in claim 2, wherein the number generator is a random number generator mounted within the equipment.

4. The security arrangement as recited in claim 2, wherein the displaying means includes a numerical display on the equipment for displaying the unpredictable numerical code.

5. The security arrangement as recited in claim 2, wherein the encryption means is operative for encrypting each unpredictable numerical code into an encrypted numerical code, each unpredictable numerical code and its corresponding encrypted numerical code being different for each enabling request.

6. The security arrangement as recited in claim 1, wherein the security control means is located at a confidential service center to which access is available only to authorized equipment users.

7. The security arrangement as recited in claim 1, wherein the detector means includes timer means for generating an elapsed time after which the disabling event is deemed to have occurred.

8. A security arrangement for protecting from unauthorized disclosure a private numerical security code used for rendering electronic equipment operational, comprising:
 (A) an equipment microprocessor within the equipment and having an internal, non-volatile, protected memory which is accessed solely by the equipment microprocessor and which is protected from interrogation external to the equipment microprocessor;
 (B) a keyboard on the equipment and operatively connected to the equipment microprocessor for manually entering the private numerical security code;
 (C) said equipment microprocessor being operative for executing a program stored in the internal memory, said program having an operational routine for rendering the equipment operational and for maintaining the equipment operational until a disabling event has occurred;
 (D) detector means operatively connected to the equipment microprocessor, for detecting when the disabling event has occurred;
 (E) said program having a disabling routine responsive to the detector means, for disabling the equipment from normal operation after the disabling event has been detected, and being further operative for maintaining the equipment disabled, even after the disabling event has terminated, until after the private numerical security code has been entered;
 (F) said program having an enabling routine for rendering disabled equipment operational in response to entry of an enabling request via the keyboard;
 (G) code generating means within the equipment and responsive to each enabling request, for generating an unpredictable numerical code each time the enabling request has been entered;
 (H) a display on the equipment for displaying the unpredictable numerical code;
 (I) said program having an encryption routine responsive to the code generating means, for encrypting each unpredictable numerical code into an encrypted numerical code which constitutes the private security code, and for causing the encrypted numerical code to be stored into the internal memory, said encryption routine and the stored encrypted numerical code being protected from interrogation external to the equipment microprocessor;
 (J) security control means located at a confidential service center separate from the equipment, and to which access is available only to cleared authorized personnel, said control means including
  (i) a control microprocessor having an internal, non-volatile, protected control memory in which a control encryption routine identical to said first-mentioned encryption routine is stored,
  (ii) a data entry means for entering the aforementioned displayed unpredictable numerical code into the control microprocessor,
  (iii) said control microprocessor executing the control encryption routine to generate the same encrypted code as previously stored in the internal memory of the equipment microprocessor, and
  (iv) a control display for displaying the same encrypted code; and
 (K) said program having a re-enabling routine responsive to entry of the same encrypted code into the equipment microprocessor via the keyboard, for again rendering the disabled equipment operational.

9. A method of protecting from unauthorized disclosure a private security code used for rendering electronic equipment operational, comprising the steps of:
 (A) locating within the equipment an equipment microprocessor having an internal protected memory which is accessed solely by the equipment microprocessor and which is protected from interrogation external to the equipment microprocessor;
 (B) entering the private security code to the equipment microprocessor;
 (C) executing an operational routine of a program stored in the internal memory, for rendering the equipment operational and for maintaining the equipment operational until a disabling event has occurred;
 (D) detecting when the disabling event has occurred;
 (E) executing a disabling routine of the program, for disabling the equipment from normal operation after the disabling event has been detected, and for maintaining the equipment disabled, even after the disabling event has been terminated, until after the private security code has been entered;
 (F) executing an enabling routine of the program, for rendering disabled equipment operational in response to entry of an enabling request during the entering step;
 (G) generating in response to each enabling request an unpredictable code each time the enabling request has been entered;
 (H) displaying the unpredictable code;
 (I) executing an encryption routine of the program, in response to the generation of each unpredictable code, for encrypting each unpredictable code into an encrypted code which constitutes the private security code, and for causing the encrypted code to be stored in the internal memory, both the encryption routine and the stored encrypted code being protected from interrogation external to the equipment microprocessor;
 (J) executing, at a separate location away from the equipment, a control encryption routine identical to the first-mentioned encryption routine by using the aforementioned displayed unpredictable code and generating therefrom the same encrypted code as previously stored in the internal memory of the equipment microprocessor; and
 (K) executing a re-enabling means of the program in response to entry of the same encrypted code into the equipment microprocessor during the entering step, for again rendering the disabled equipment operational.

* * * * *